(12) United States Patent
Li

(10) Patent No.: US 10,816,706 B2
(45) Date of Patent: Oct. 27, 2020

(54) DISPLAY DEVICE

(71) Applicant: BOE TECHNOLOGY GROUP CO., LTD., Beijing (CN)

(72) Inventor: Yingyi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 375 days.

(21) Appl. No.: 15/742,654

(22) PCT Filed: Jul. 14, 2017

(86) PCT No.: PCT/CN2017/092954
§ 371 (c)(1),
(2) Date: Jan. 8, 2018

(87) PCT Pub. No.: WO2018/054140
PCT Pub. Date: Mar. 29, 2018

(65) Prior Publication Data
US 2018/0372933 A1 Dec. 27, 2018

(30) Foreign Application Priority Data

Sep. 23, 2016 (CN) .......................... 2016 1 0849565

(51) Int. Cl.
*G02B 5/20* (2006.01)
*G02B 5/28* (2006.01)
(Continued)

(52) U.S. Cl.
CPC ....... *G02B 5/285* (2013.01); *G02F 1/133509* (2013.01); *G02F 1/133514* (2013.01);
(Continued)

(58) Field of Classification Search
CPC .......... G02B 5/285; G02B 1/115; G02B 5/28; G02B 5/288; G02B 6/29361;
(Continued)

(56) References Cited

U.S. PATENT DOCUMENTS

| 4,247,167 A | 1/1981 | Tokuhara |
| 2013/0077029 A1* | 3/2013 | Nagato ................. G02B 5/201 |
| | | 349/105 |

(Continued)

FOREIGN PATENT DOCUMENTS

| CN | 1828345 A | 9/2006 |
| CN | 103278961 A | 9/2013 |

(Continued)

OTHER PUBLICATIONS

Chinese office action dated Jul. 10, 2017 for corresponding CN application No. 201610849565.6 with English translation attached.
Chinese office action dated Oct. 20, 2017 for corresponding CN application No. 201610849565.6.
International search report dated Sep. 27, 2017 for corresponding application No. PCT/CN2017/092954.

*Primary Examiner* — William R Alexander
*Assistant Examiner* — Henry A Duong
(74) *Attorney, Agent, or Firm* — Nath, Goldberg & Meyer; Joshua B. Goldberg

(57) ABSTRACT

The present disclosure provides a display device, belonging to a field of display technology, and can address a problem in an existing display device that short-wavelength blue light causes harm to human eyes. The display device includes a light attenuation unit, wherein the light attenuation unit comprises at least one first layer and at least one second layer which are alternately provided, the first layer having a refractive index greater than a refractive index of the second layer, and the light attenuation unit is configured to reduce a transmittance of the short-wavelength blue light among incident light.

16 Claims, 5 Drawing Sheets

(51) Int. Cl.
*G02F 1/1335* (2006.01)
*G02F 1/1362* (2006.01)
*G02F 1/13363* (2006.01)

(52) U.S. Cl.
CPC .. *G02F 1/136209* (2013.01); *G02F 1/136227* (2013.01); *G02F 2001/133521* (2013.01); *G02F 2001/133638* (2013.01); *G02F 2201/086* (2013.01); *G02F 2201/123* (2013.01); *G02F 2203/055* (2013.01)

(58) Field of Classification Search
CPC ......... G02F 1/136209; G02F 1/133509; G02F 1/136227; G02F 1/133514; G02F 2203/055; G02F 2201/086; G02F 2001/133638; G02F 2201/123; G02F 2001/133521
USPC ........................................................ 358/588
See application file for complete search history.

(56) References Cited

U.S. PATENT DOCUMENTS

| | | | | |
|---|---|---|---|---|
| 2014/0022499 | A1* | 1/2014 | Tamaki | G02F 1/13439 349/106 |
| 2015/0253478 | A1* | 9/2015 | Aube | G02C 7/107 359/589 |
| 2020/0052003 | A1* | 2/2020 | Yamazaki | G02F 1/1368 |

FOREIGN PATENT DOCUMENTS

| | | |
|---|---|---|
| CN | 105093377 A | 11/2015 |
| CN | 105182595 A | 12/2015 |
| CN | 204964945 U | 1/2016 |
| CN | 106405921 A | 2/2017 |
| JP | H10153705 A | 6/1998 |

* cited by examiner

DISPLAY DEVICE

This is a National Phase Application filed under 35 U.S.C. 371 as a national stage of PCT/CN2017/092954, filed Jul. 14, 2017, an application claiming the benefit of Chinese Application No. 201610849565.6, filed Sep. 23, 2016, the content of each of which is hereby incorporated by reference in its entirety.

CROSS-REFERENCE TO RELATED APPLICATIONS

The present application claims the priority of Chinese Patent Application No. 201610849565.6, filed on Sep. 23, 2016, the contents of which are incorporated herein in their entirety by reference.

TECHNICAL FIELD

The present disclosure belongs to the field of display technology, and in particular, relates to a display device.

BACKGROUND

In an existing display device, blue light among light emitted from a light source such as a light emitting diode (LED) and the like may cause harm to human eyes. Blue light is visible light with the highest energy that is close to ultraviolet light region, with a wavelength in a range of 400-500 nm, appearing to be of blue color as observed by human eyes. Blue light includes short-wavelength blue light with a wavelength in a range of 400-450 nm and long-wavelength blue light with a wavelength in a range of 450-500 nm, where the short-wavelength blue light does a greater harm to human eyes due to its smaller wavelength and greater energy.

SUMMARY

The present disclosure is intended to address at least one of the technical problems existing in the prior art, and proposes a display device capable of reducing damage to human eyes caused by the short-wavelength blue light.

According to an aspect of the present disclosure, a display device includes a light attenuation unit, wherein the light attenuation unit comprises at least one first layer and at least one second layer which are alternately provided, the first layer having a refractive index greater than a refractive index of the second layer, and the light attenuation unit is configured to reduce a transmittance of the short-wavelength blue light among incident light.

According to an embodiment of the present disclosure, an optical thickness of one of the first and second layers may be half of an optical thickness of the other of the first and second layers.

According to an embodiment of the present disclosure, among the at least one first layer and the at least one second layer which are alternately provided, an optical thickness of each of uppermost and lowermost layers may be half of an optical thickness of each of the other layers.

According to an embodiment of the present disclosure, the light attenuation unit may have a structure as follows:

$$\left(\frac{H}{2} L \frac{H}{2}\right)^m \text{ or } \left(\frac{L}{2} H \frac{L}{2}\right)^m$$

where H and L represent the first layer and the second layer with a same optical thickness, respectively; H/2 and L/2 represent the first layer and the second layer, respectively, whose optical thicknesses are half of optical thicknesses of H and L, respectively; and m is an integer greater than or equal to 1.

According to an embodiment of the present disclosure, H and L may represent the first and second layers with an optical thickness of $\lambda/4$, respectively, and H/2 and L/2 may represent the first and second layers with an optical thickness of $\lambda/8$, respectively, where $\lambda$ is a wavelength of the short-wavelength blue light in vacuum.

According to an embodiment of the present disclosure, a total number of the at least one first layer and the at least one second layer may be 3 to 50.

According to an embodiment of the present disclosure, the short-wavelength blue light may have a zero transmittance in the light attenuation unit. According to an embodiment of the present disclosure, the short-wavelength blue light may have a transmittance of 10% to 99% in the light attenuation unit.

According to an embodiment of the present disclosure, the short-wavelength blue light may have a transmittance of 60% to 80% in the light attenuation unit.

According to an embodiment of the present disclosure, the display device may further comprise a display panel, the display panel may comprise a first base plate and second base plate provided opposite to each other, wherein the light attenuation unit may be positioned at one of a side of the second base plate proximal to the first base plate and at a side of the second base plate distal to the first base plate.

According to an embodiment of the present disclosure, the second base plate may comprise a blue sub-pixel, and the light attenuation unit may be provided at a position corresponding to the blue sub-pixel.

According to an embodiment of the present disclosure, the display device may further comprise a display panel, the display panel may comprise a first base plate and second base plate provided opposite to each other, wherein the light attenuation unit may be positioned at one of a side of the first base plate proximal to the second base plate and a side of the first base plate distal to the second base plate.

According to an embodiment of the present disclosure, the second base plate may comprise a second substrate and a blue sub-pixel at a side of the second substrate proximal to the first base plate, and the light attenuation unit may be provided at a position corresponding to the blue sub-pixel.

According to an embodiment of the present disclosure, the display device may further comprise a display panel, the display panel may comprise a first base plate and second base plate provided opposite to each other, wherein the second base plate may comprise a second substrate and a blue sub-pixel at a side of the second substrate proximal to the first base plate, the first base plate may comprises a first substrate, a thin film transistor on the first substrate, and a pixel electrode connected to the thin film transistor, and the light attenuation unit may be positioned between the first substrate and the pixel electrode.

According to an embodiment of the present disclosure, the pixel electrode may be provided at a position corresponding to the blue sub-pixel, and the light attenuation unit may be provided at a position corresponding to the pixel electrode.

According to an embodiment of the present disclosure, the light attenuation unit may be further provided at a position corresponding to the thin film transistor.

According to an embodiment of the present disclosure, the first base plate may further comprise one of a gate insulating layer and a passivation layer, and the light attenuation unit and the one of the gate insulating layer and the passivation layer may be integrated into one layer.

According to an embodiment of the present disclosure, the light attenuation unit may be used as one of a gate insulating layer and a passivation layer.

According to an embodiment of the present disclosure, the display device may further comprise a display panel, the display panel may comprise a first base plate and second base plate provided opposite to each other, wherein the second base plate may comprise a second substrate and a blue sub-pixel at a side of the second substrate proximal to the first base plate, the first base plate may comprise a first substrate, a thin film transistor on the first substrate, and a pixel electrode connected to the thin film transistor, and the light attenuation unit may be positioned on the pixel electrode, and the pixel electrode may be provided at a position corresponding to the blue sub-pixel.

DETAILED DESCRIPTION

To make one of ordinary skill in the art better understand the technical solutions according to the present disclosure, the present disclosure will be further described in detail below with reference to the accompanying drawings and specific embodiments.

Referring to FIGS. 1 to 8, a display device according to an embodiment of the present disclosure may include a light attenuation unit 1. The light attenuation unit 1 may include at least one first layers 11 and at least one second layers 12 which are alternately provided, the first layers 11 having a refractive index greater than that of the second layers 12. The light attenuation unit 1 may be configured to reduce a transmittance of the short-wavelength blue light among incident light.

In some embodiments, incident light incident on the light attenuation unit 1 may be emitted by a light source such as a backlight source, and may be white light, that is, mixed color light. The light attenuation unit 1 can decrease a transmittance of only the short-wavelength blue light among the incident light (e.g. mixed color light), without affecting a transmittance of other color light (such as red light, green light or the like) among the mixed color light.

Since the first layers 11 and the second layers 12 have different refractive indices, the short-wavelength blue light goes through reflection multiple times on interfaces between the first and second layers 11 and 12, so that a transmittance of the short-wavelength blue light is decreased. Specifically, since the short-wavelength blue light among incident light goes through interference and diffraction in the light attenuation unit 1, such that the short-wavelength blue light goes through reflection after being incident on the light attenuation unit 1 at a light incoming side and/or goes through diffraction when exiting from the light attenuation unit 1 at a light exiting side, a transmittance of the short-wavelength blue light in the display device is reduced, and further an intensity of the short-wavelength blue light among the incident light is reduced.

In some embodiments, the display device may further include a display panel and a backlight source, and the backlight source may be located at a light incoming side of the display panel.

In some embodiments, the first layers 11 may include but not limited to one or more of the following materials: $Ti_xO_y$ (for example, TiO, $Ti_2O_3$, $Ti_3O_5$ and the like), $ZrO_2$, $HfO_2$, $Ta_2O_5$, $Nb_2O_5$, ZnS, ZnSe, SiO, $SiN_x$ and the like; the second layers 12 may include but not limited to one or more of the following materials: $SiO_2$, $MgF_2$, $NaAlF_6$, and rare earth fluorides such as $YbF_3$, $YF_3$, $LaF_3$, $NdF_3$ and the like.

Figure 1:
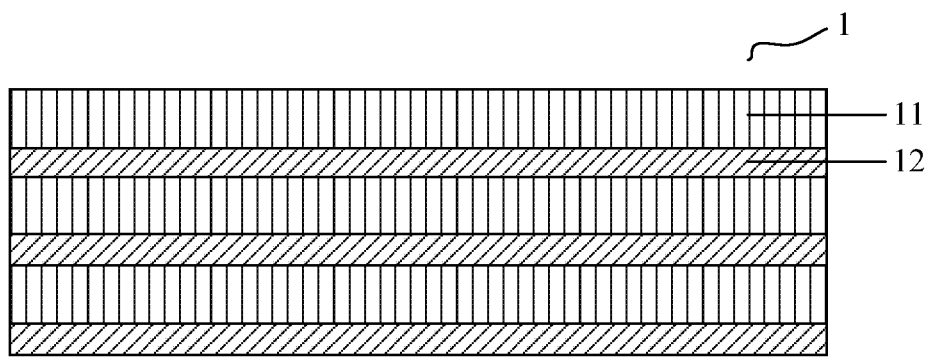
FIG. 1 is a schematic diagram of structure of a light attenuation unit in a display device according to an embodiment of the present disclosure.
Figure 2:
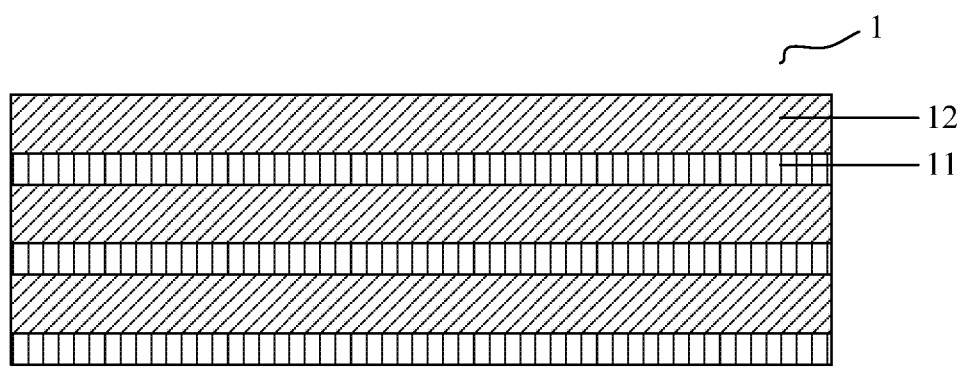
FIG. 2 is a schematic diagram of structure of a light attenuation unit in a display device according to another embodiment of the present disclosure.

In some embodiments, an optical thickness of the first layer 11 may be half of an optical thickness of the second layer 12, as shown in FIG. 2. The "optical thickness" refers to an optical path in a thickness direction, that is, a refractive index of a medium multiplied by a thickness thereof. For example, the second layer 12 may have an optical thickness of $\lambda/4$ and the first layer 11 may have an optical thickness of $\lambda/8$, where $\lambda$ is a wavelength of the short-wavelength blue light in vacuum. Alternatively, an optical thickness of the second layer 12 may be half of an optical thickness of the first layer 11, as shown in FIG. 1.

In some embodiments, among the alternately arranged at least one first layers 11 and at least one second layers 12, each of the uppermost and lowermost layers may have an optical thickness which is half of an optical thickness of each of the other layers (between the uppermost and lowermost layers). For example, an exemplary structure of the light attenuation unit 1 may be represented as:

$$\left(\frac{H}{2}L\frac{H}{2}\right)^m \text{ or } \left(\frac{L}{2}H\frac{L}{2}\right)^m$$

where H and L represent a high refractive index layer (the first layer) and a low refractive index layer (the second layer) with a same optical thickness, respectively; H/2 and L/2 represent a high refractive index layer (the first layer) and a low refractive index layer (the second layer), respectively, whose optical thicknesses are half of optical thicknesses of H and L, respectively; and m is an integer greater than or equal to 1. For example, H and L may represent the first and second layers with an optical thickness of λ/4, respectively, and H/2 and L/2 may represent the first and second layers with an optical thickness of λ/8, respectively.

A relationship between an optical thickness of the first layer 11 and an optical thickness of the second layer 12 is not limited to the embodiments described herein, and various arrangements can be made based on practical situations.

In some embodiments, a total number of the first layers 11 and the second layers 12 may be in a range of 3 to 50.

It can be appreciated that a larger total number of the first layers 11 and the second layers 12 provides a lower transmittance of the short-wavelength blue light, but increases a total thickness of the light attenuation unit 1, thus a total thickness of the display device including the light attenuation unit 1 may also increase. If a total number of the first layers 11 and the second layers 12 is small, then a transmittance of the short-wavelength blue light is relatively high, but a total thickness of the light attenuation unit 1 is reduced, thus a total thickness of the display device including the light attenuation unit 1 may also decrease. Thus, when setting the total number of the first layers 11 and the second layers 12, both the transmittance of the short-wavelength blue light and the total thickness of the display device need to be taken into account. The total number of the first layers 11 and the second layers 12 is not limited to the embodiment described herein, and various arrangements can be made based on practical situations.

It is to be noted that factors influencing a transmittance of the short-wavelength blue light in the light attenuation unit 1 include a total number of the first layers 11 and the second layers 12, a difference in refractive indices of the first layer 11 and the second layer 12, and a total thickness of the light attenuation unit 1 etc.

In some embodiments, the light attenuation unit may be fabricated by a process such as physical vapor deposition, chemical vapor deposition, liquid phase film forming and the like, and preferably by physical vapor deposition and chemical vapor deposition. Physical vapor deposition may include vacuum evaporation, sputtering, ion plating and the like, and chemical vapor deposition may include plasma enhanced chemical vapor deposition and the like. A process for preparing the light attenuation unit is not limited to the embodiment described herein, and various arrangements can be made based on practical situations.

In some embodiments, the display device may further include a display panel, and the display panel may include a first base plate 2 and a second base plate 3 provided opposite to each other. The light attenuation unit 1 may be located at a side of the second base plate 3 proximal to the first base plate 2, as shown in FIGS. 3 and 5; alternatively, the light attenuation unit 1 may be located at a side of the second base plate 3 distal to the first base plate 2, as shown in FIGS. 2 and 4.

Figure 3:
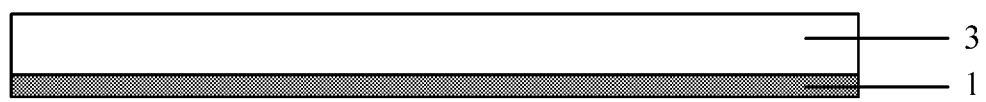
FIG. 3 is a schematic diagram of structure of a display device according to an embodiment of the present disclosure.
Figure 3:
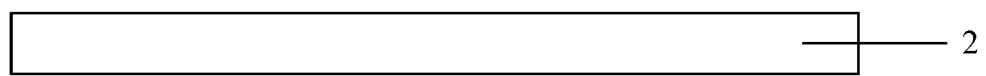
Figure 4:
FIG. 4 is a schematic diagram of structure of a display device according to another embodiment of the present disclosure.
Figure 4:

As shown in FIGS. 3 and 4, the light attenuation unit 1 may be provided on a whole side of the second base plate 3.

Figure 5:
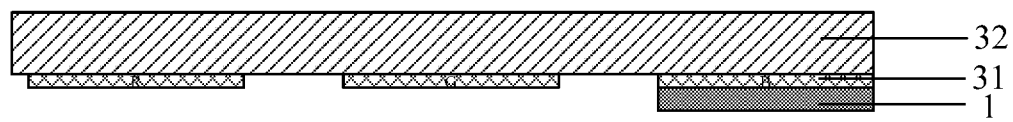
FIG. 5 is a schematic diagram of structure of a display device according to another embodiment of the present disclosure.
Figure 5:
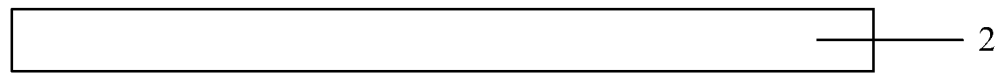
Figure 6:
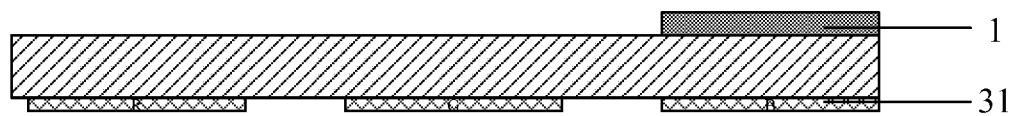
FIG. 6 is a schematic diagram of structure of a display device according to another embodiment of the present disclosure.
Figure 6:
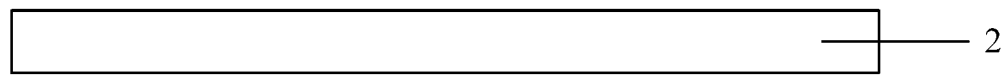

In some embodiments, the second base plate 3 may include a blue sub-pixel 31, and the light attenuation unit 1 may be provided at a position corresponding to the blue sub-pixel 31, as shown in FIGS. 5 and 6.

In some embodiments, the second base plate 3 may be a color film substrate, and may include a blue sub-pixel 31 and sub-pixels of other colors (such as red sub-pixel and green sub-pixel). In this case, the light attenuation unit 1 may be provided on a whole side of the second base plate 3, which does not affect a transmittance of light of other colors other than blue light, but may cause an influence on a total brightness of the display device. Thus, the light attenuation unit 1 may be provided at a position corresponding to the blue sub-pixel 31, thereby reducing its influence on a total brightness of the display device.

Figure 7:
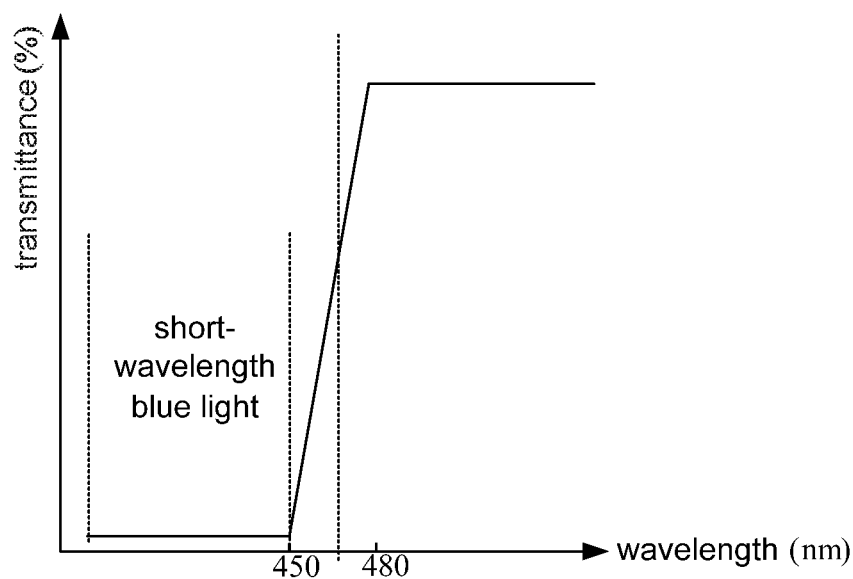
FIG. 7 is a graph of light transmittance of a display device according to an embodiment of the present disclosure.

In some embodiments, the short-wavelength blue light may have a zero transmittance in the light attenuation unit 1. As shown in FIG. 7, the short-wavelength blue light may have a very low transmittance, but a transmittance of long-wavelength light (for example, with a wavelength longer than about 480 nm) is not affected.

Figure 8:
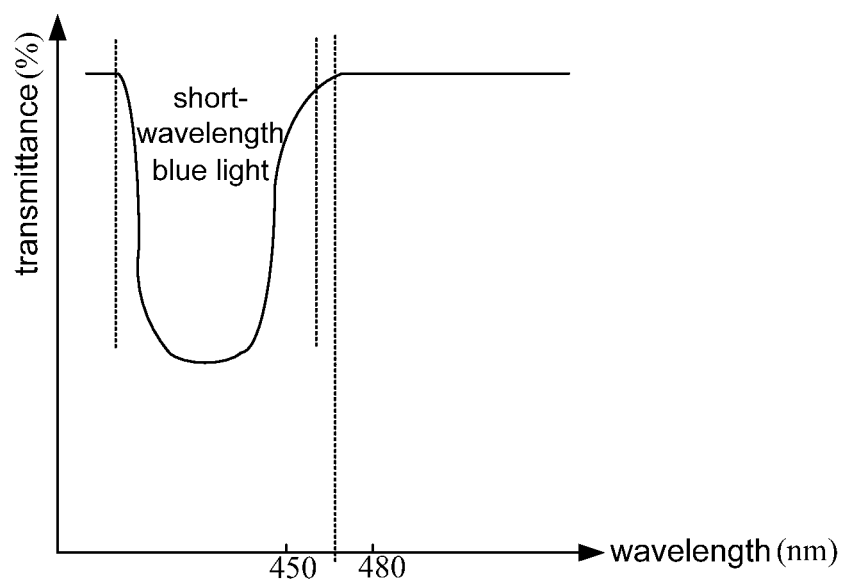
FIG. 8 is a graph of light transmittance of a display device according to another embodiment of the present disclosure.

In some embodiments, the short-wavelength blue light may have a transmittance of 10% to 99%, preferably 60% to 80%, in the light attenuation unit 1. In a case where the short-wavelength blue light has a transmittance of 60% to 80% in the light attenuation unit 1, compared to a case where the transmittance thereof is zero, the display device has an improved brightness. As shown in FIG. 8, the short-wavelength blue light may have a certain (non-zero) transmittance, and a transmittance of long-wavelength light (for example, with a wavelength longer than about 480 nm) is not affected.

It will be appreciated that if the short-wavelength blue light among light emitted by a light source has a zero transmittance in the light attenuation unit 1, then it means no short-wavelength blue light is emitted from the light attenuation unit 1 at the light exiting side, that is, the short-wavelength blue light is completely reflected back to the light source by the light attenuation unit 1; if the short-wavelength blue light among light emitted by a light source has a transmittance greater than zero and smaller than 100% in the light attenuation unit 1, then it means a part of the short-wavelength blue light is emitted from the light attenuation unit 1 at the light exiting side, and the other part of the short-wavelength blue light is reflected back to the light source by the light attenuation unit 1.

In some embodiments, the display device may be a liquid crystal display panel, an electronic paper, a mobile phone, a tablet computer, a television, a monitor, a notebook computer, a digital photo frame, a navigator or any other product or device having a display function.

Figure 9:
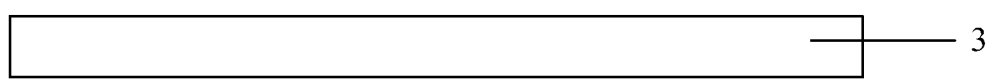
FIG. 9 is a schematic diagram of structure of a display device according to another embodiment of the present disclosure.
Figure 9:
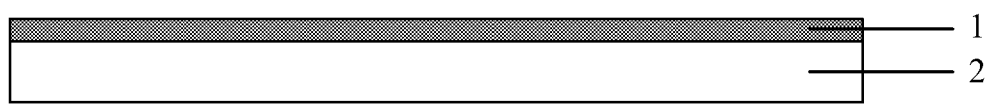
Figure 10:
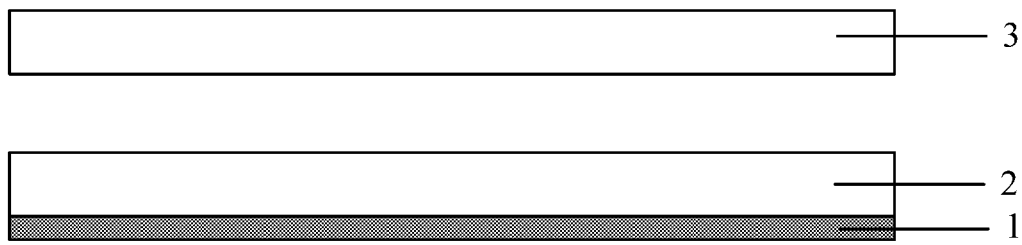
FIG. 10 is a schematic diagram of structure of a display device according to another embodiment of the present disclosure.
Figure 11:
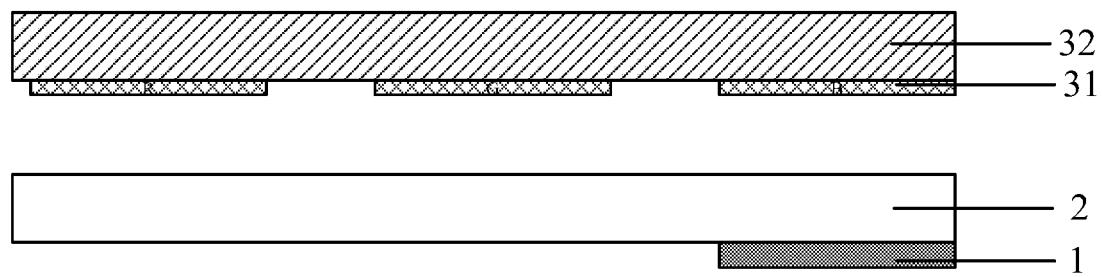
FIG. 11 is a schematic diagram of structure of a display device according to another embodiment of the present disclosure.

Referring to FIGS. 9 to 11, in some embodiments, the display device may further include a display panel, and the display panel may include a first base plate 2 and a second base plate 3 provided opposite to each other. The light attenuation unit 1 may be located at a side of the first base plate 2 proximal to the second base plate 3; alternatively, the light attenuation unit 1 may be located at a side of the first base plate 2 distal to the second base plate 3. As shown in FIGS. 9 and 10, the light attenuation unit 1 may be provided on a whole side of the first base plate 2.

As shown in FIG. 11, the second base plate 3 may include a second substrate 32 and a blue sub-pixel 31 at a side of the second substrate 32 proximal to the first base plate 2, and the light attenuation unit 1 may be provided at a position on a side of the first base plate 2 distal to the second base plate 3 corresponding to the blue sub-pixel 31. In some embodiments, the second base plate 3 may be a color film substrate, and the second base plate 3 may include the second substrate 32, the blue sub-pixel 31 and sub-pixels of other colors (such as red sub-pixel and green sub-pixel), the blue sub-pixel 31 may be located at a side of the second substrate 32 proximal to the first base plate 2. In this case, the light attenuation unit 1 may be provided on a whole side of the first base plate 2, which does not affect a transmittance of light of other colors other than blue light, but may cause an influence on a total brightness of the display device. Thus, the light attenuation unit 1 may be provided at a position corresponding to the blue sub-pixel 31, thereby reducing its influence on a total brightness of the display device.

Figure 12:
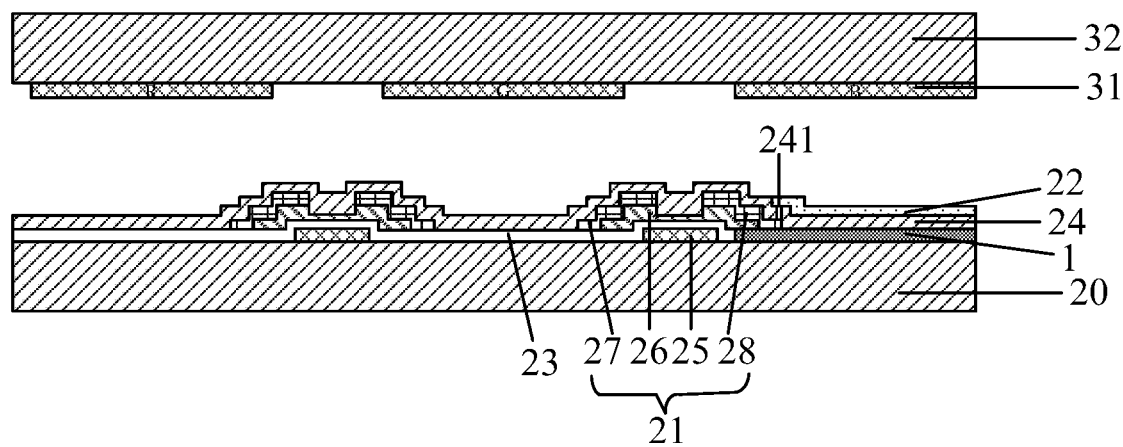
FIG. 12 is a schematic diagram of structure of a display device according to another embodiment of the present disclosure.
Figure 13:
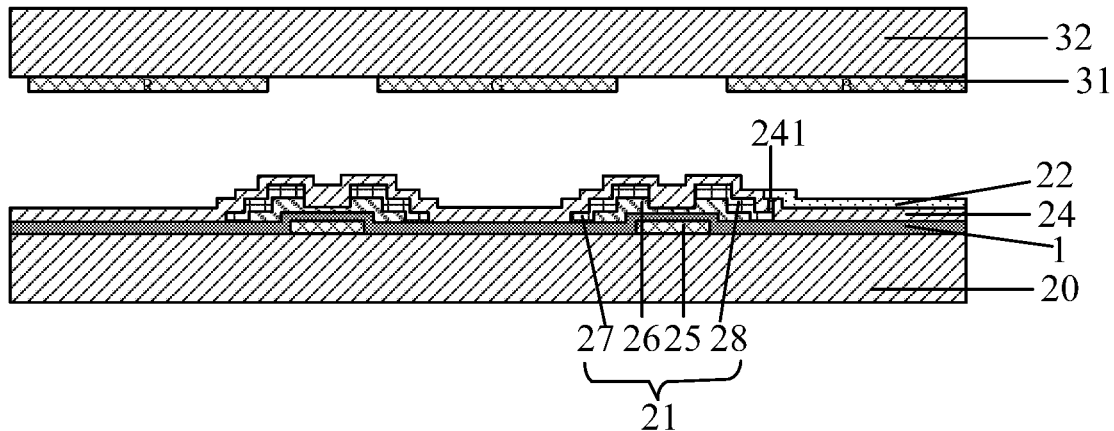
FIG. 13 is a schematic diagram of structure of a display device according to another embodiment of the present disclosure.
Figure 14:
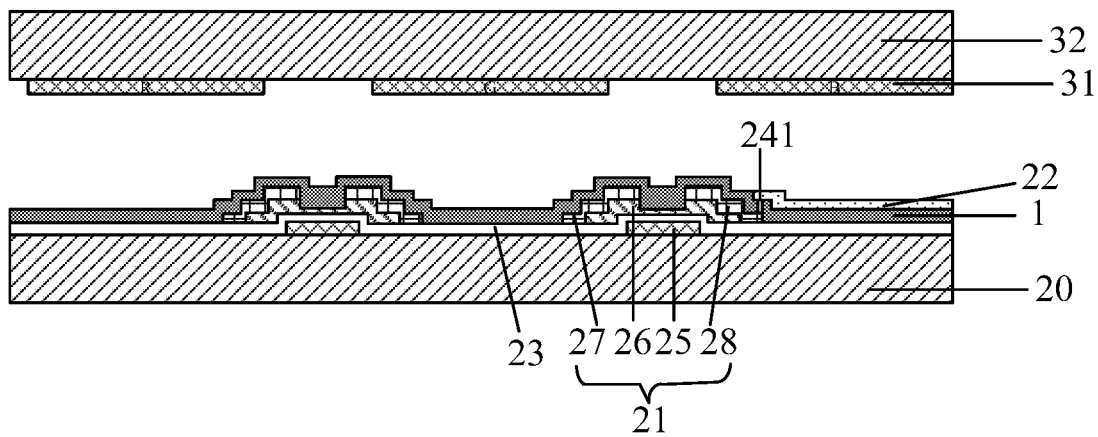
FIG. 14 is a schematic diagram of structure of a display device according to another embodiment of the present disclosure.

Referring to FIGS. 12 to 14, in some embodiments, the display device may further include a display panel, and the display panel may include a first base plate 2 and a second base plate 3 provided opposite to each other. The second base plate 3 may include a second substrate 32 and a blue sub-pixel 31 at a side of the second substrate 32 proximal to the first base plate 2. The first base plate 2 may include a first substrate 20, a thin film transistor 21 on the first substrate 20, and a pixel electrode 22 connected to the thin film transistor 21. The light attenuation unit 1 may be located between the first substrate 20 and the thin film transistor 21. The pixel electrode 22 may be provided at a position corresponding to the blue sub-pixel 31, and the light attenuation unit 1 may be provided at a position on the first substrate 20 corresponding to the pixel electrode 22, that is, the light attenuation unit 1 is also provided at a position corresponding to the blue sub-pixel 31, so that a transmittance of the short-wavelength blue light is decreased, without affecting a brightness of the display device.

The thin film transistor 21 may include a gate 25, an active layer 26, a source 27 and a drain 28. The gate 25 may be positioned on the first substrate 20, a gate insulating layer 23 may be provided on the gate 25, the active layer 26 may be positioned on the gate insulating layer 23, a part of the source 27 and a part of the drain 28 may be located on the active layer 26, a passivation layer 24 may be provided on the source 27 and the drain 28, and the pixel electrode 22 may be located on the passivation layer 24 and fill a space in a through hole 241 of the passivation layer 24, to be connected to the drain 28 of the thin film transistor 21 via the through hole 241.

In some embodiments, the light attenuation unit 1 may also be provided at a position corresponding to the thin film transistor 21. That is to say, the light attenuation unit 1 may be provided at a position corresponding to the thin film transistor 21 and at a position corresponding to the blue sub-pixel 31.

Referring to FIG. 12, in some embodiments, the light attenuation unit 1 may be integrated with the gate insulating layer 23, that is, the light attenuation unit 1 and the gate insulating layer 23 may be integrated into one layer. Referring to FIG. 13, in some embodiments, the light attenuation unit 1 may be used as a gate insulating layer. In other words, the light attenuation unit 1 may be located on the first substrate 20, serving as a gate insulating layer, that is, the light attenuation unit 1 may replace the gate insulating layer 23 in FIG. 12, playing a same function as the gate insulating layer 23. Compared to a display device where the gate insulating layer 23 and the light attenuation unit 1 are provided as two layers separated from one another, a design where the light attenuation unit 1 and the gate insulating layer 23 are integrated into one layer or where the light attenuation unit 1 is further used as a gate insulating layer can remove one structural layer, so as to achieve a light and thin product while reducing a transmittance of the short-wavelength blue light.

In some embodiments, the light attenuation unit 1 may be integrated with the passivation layer 24, that is, the light attenuation unit 1 and the passivation layer 24 may be integrated into one layer. Referring to FIG. 14, in some embodiments, the light attenuation unit 1 may be used as the passivation layer 24. In other words, the light attenuation unit 1 may be located on the thin film transistor 21, serving as a passivation layer, that is, the light attenuation unit 1 may replace the passivation layer 24 in FIG. 12, playing a same function as the passivation layer 24. Compared to a display device where the passivation layer 24 and the light attenuation unit 1 are provided as two layers separated from one another, a design where the light attenuation unit 1 and the passivation layer 24 are integrated into one layer or where the light attenuation unit 1 is further used as a passivation layer can remove one structural layer, so as to achieve a light and thin product while reducing a transmittance of the short-wavelength blue light.

Figure 15:
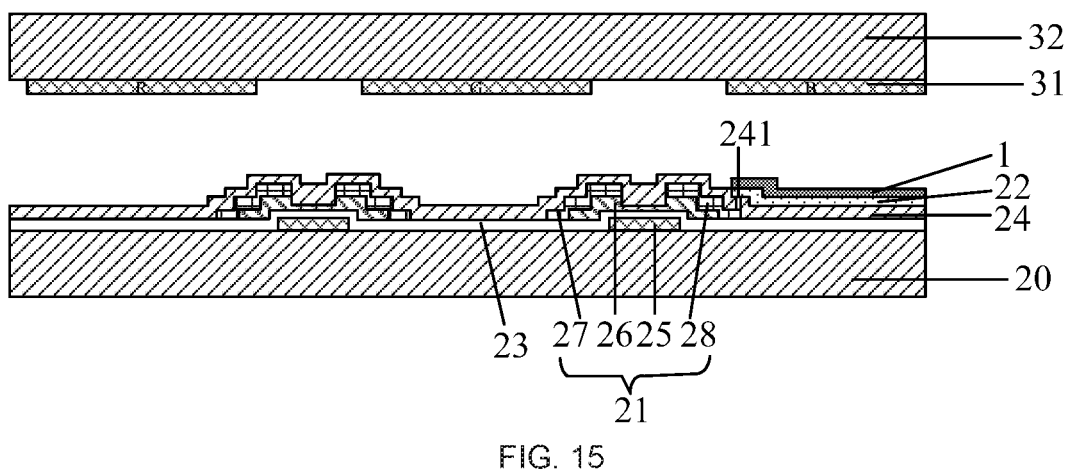
FIG. 15 is a schematic diagram of structure of a display device according to another embodiment of the present disclosure.

Referring to FIG. 15, the light attenuation unit 1 may be located on the pixel electrode 22. The pixel electrode 22 may be provided at a position corresponding to the blue sub-pixel 31. As such, the light attenuation unit 1 is also provided at a position corresponding to the blue sub-pixel 31, so that a transmittance of the short-wavelength blue light is decreased, without affecting a brightness of the display device.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A display device, comprising a light attenuation unit, wherein the light attenuation unit comprises at least one first layer and at least one second layer which are alternately provided, the first layer having a refractive index greater than a refractive index of the second layer;

the light attenuation unit has a structure as follows:

$$\left(\frac{H}{2}L\frac{H}{2}\right)^m \text{ or } \left(\frac{L}{2}H\frac{L}{2}\right)^m$$

where H represents the first layer with an optical thickness, L represents the second layer with the optical thickness; where H and L represents the first layer and the second layer with a same optical thickness; H/2 represents the first layer whose optical thickness is half of the optical thickness of H, L/2 represents the second layer whose optical thickness is half of the optical thickness of L;

$$\left(H\frac{L}{2}\right)$$

represents a stacked structure of (the first layer/the second layer);

$$\left(L\frac{H}{2}\right)$$

represents a stacked structure of (the second layer/the first layer); and m is a number of stacked structures and is an integer greater than or equal to 1; and the optical thickness of the first or second layer is an optical path in a thickness direction of the first or second layer, and is equal to a product of the refractive index and a thickness of the first or second layer.

2. The display device according to claim 1, wherein H and L represent the first and second layers with an optical thickness of λ/4, respectively, and H/2 and L/2 represent the first and second layers with an optical thickness of λ/8, respectively, where λ is a wavelength of the short-wavelength blue light in vacuum.

3. The display device according to claim 1, wherein a total number of the at least one first layer and the at least one second layer is 3 to 50.

4. The display device according to claim 1, wherein the short-wavelength blue light has a zero transmittance in the light attenuation unit.

5. The display device according to claim 1, wherein the short-wavelength blue light has a transmittance of 10% to 99% in the light attenuation unit.

6. The display device according to claim 5, wherein the short-wavelength blue light has a transmittance of 60% to 80% in the light attenuation unit.

7. The display device according to claim 1, further comprising a display panel, the display panel comprising a first base plate and second base plate provided opposite to each other, wherein the light attenuation unit is positioned at one of a side of the second base plate proximal to the first base plate and a side of the second base plate distal to the first base plate.

8. The display device according to claim 7, wherein the second base plate comprises a blue sub-pixel, and the light attenuation unit is provided at a position corresponding to the blue sub-pixel.

9. The display device according to claim 1, further comprising a display panel, the display panel comprising a first base plate and second base plate provided opposite to each other, wherein the light attenuation unit is positioned at one of a side of the first base plate proximal to the second base plate and a side of the first base plate distal to the second base plate.

10. The display device according to claim 9, wherein the second base plate comprises a second substrate and a blue sub-pixel at a side of the second substrate proximal to the first base plate, and the light attenuation unit is provided at a position corresponding to the blue sub-pixel.

11. The display device according to claim 1, further comprising a display panel, the display panel comprising a first base plate and second base plate provided opposite to each other, wherein the second base plate comprises a second substrate and a blue sub-pixel at a side of the second substrate proximal to the first base plate, the first base plate comprises a first substrate, a thin film transistor on the first substrate, and a pixel electrode connected to the thin film transistor, and the light attenuation unit is positioned between the first substrate and the pixel electrode.

12. The display device according to claim 11, wherein the pixel electrode is provided at a position corresponding to the blue sub-pixel, and the light attenuation unit is provided at a position corresponding to the pixel electrode.

13. The display device according to claim 12, wherein the light attenuation unit is further provided at a position corresponding to the thin film transistor.

14. The display device according to claim 12, wherein the first base plate further comprises one of a gate insulating layer and a passivation layer, and the light attenuation unit and the one of the gate insulating layer and the passivation layer are integrated into one layer.

15. The display device according to claim 11, wherein the light attenuation unit is used as one of a gate insulating layer and a passivation layer.

16. The display device according to claim 1, further comprising a display panel, the display panel comprising a first base plate and second base plate provided opposite to each other, wherein the second base plate comprises a second substrate and a blue sub-pixel at a side of the second substrate proximal to the first base plate, the first base plate comprises a first substrate, a thin film transistor on the first substrate, and a pixel electrode connected to the thin film transistor, and the light attenuation unit is positioned on the pixel electrode, and the pixel electrode is provided at a position corresponding to the blue sub-pixel.

* * * * *